(12) United States Patent
Umehara et al.

(10) Patent No.: US 11,168,901 B2
(45) Date of Patent: Nov. 9, 2021

(54) REFRIGERATION CYCLE APPARATUS (71) Applicant: Mitsubishi Electric Corporation, Tokyo (JP)

(72) Inventors: Shigeo Umehara, Tokyo (JP); Keisuke Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 233 days.

(21) Appl. No.: 16/490,241

(22) PCT Filed: Mar. 28, 2017

(86) PCT No.: PCT/JP2017/012617
§ 371 (c)(1),
(2) Date: Aug. 30, 2019

(87) PCT Pub. No.: WO2018/179083
PCT Pub. Date: Oct. 4, 2018

(65) Prior Publication Data
US 2020/0011545 A1  Jan. 9, 2020

(51) Int. Cl.
*F24F 1/24* (2011.01)
*H02K 11/33* (2016.01)
*H01F 27/18* (2006.01)

(52) U.S. Cl.
CPC .............. *F24F 1/24* (2013.01); *H01F 27/18* (2013.01); *H02K 11/33* (2016.01); *H02K 2211/03* (2013.01)

(58) Field of Classification Search
CPC ... F24F 1/24; F24F 1/56; H02K 11/33; H02K 2211/03; H01F 27/18
See application file for complete search history.

(56) References Cited

U.S. PATENT DOCUMENTS

2009/0260382 A1* 10/2009 Takeichi ............... F24F 1/46
62/259.1
2012/0293290 A1* 11/2012 Kido .................... H01F 27/10
336/60

FOREIGN PATENT DOCUMENTS

| CN | 202792285 U | 3/2013 |
| CN | 106247483 A | 12/2016 |
| JP | S63-200391 U | 12/1988 |
| JP | H9-196417 A | 7/1997 |
| JP | 2000-104950 A | 4/2000 |

(Continued)

OTHER PUBLICATIONS

Office Action dated Sep. 2, 2020 issued in corresponding CN application No. 201780088623.0(and English translation).

(Continued)

*Primary Examiner* — Emmanuel E Duke
(74) *Attorney, Agent, or Firm* — Posz Law Group, PLC (57) ABSTRACT A refrigeration cycle apparatus includes a partition plate that partitions the inside of a housing of an outdoor unit into a blower chamber and a machine chamber, a reactor attached to the partition plate on a side of the machine chamber, a fixing member that fixes the reactor to the partition plate, and a plate-like first heat transfer member provided between the reactor and the partition plate, and in the refrigeration cycle apparatus, the first heat transfer member is provided between the partition plate and the reactor, and the thermal resistance of the first heat transfer member is smaller than the thermal resistance of the fixing member.

8 Claims, 9 Drawing Sheets

(56) References Cited

FOREIGN PATENT DOCUMENTS

| | | | | |
|---|---|---|---|---|
| JP | 2000104950 | A | * | 4/2000 |
| JP | 2013-110856 | A | | 6/2013 |
| JP | 2013-232476 | A | | 11/2013 |
| JP | 2013232476 | A | * | 11/2013 |
| JP | 2014-127515 | A | | 7/2014 |
| JP | 2014127515 | A | * | 7/2014 |
| JP | 2015-029147 | A | | 2/2015 |

OTHER PUBLICATIONS

Office Action dated Jun. 9, 2020 issued in corresponding JP application No. 2019-508380(and English translation).
Office Action dated Oct. 6, 2020 for the corresponding JP patent application No. 2019-508380 (and English machine translation).
International Search Report of the International Searching Authority dated May 9, 2017 in corresponding international application No. PCT/JP2017/012617 (and English translation).

* cited by examiner

REFRIGERATION CYCLE APPARATUS

CROSS REFERENCE TO RELATED APPLICATION

This application is a U.S. national stage application of International Patent Application No. PCT/JP2017/012617 filed on Mar. 28, 2017, the disclosure of which is incorporated herein by reference.

TECHNICAL FIELD

The present invention relates to a refrigeration cycle apparatus including an outdoor unit.

BACKGROUND

A reactor disclosed in Patent Literature 1 includes a base portion, a core provided in the base portion, a winding accommodated in a winding accommodation space formed in the core, and a cylindrical heat transfer member provided such that an inner peripheral surface thereof contacts an outer peripheral surface of the core and an outer peripheral surface of the winding. In the reactor disclosed in Patent Literature 1, heat dissipation properties of the core are enhanced by employing a structure in which heat of the core is transferred to the cylindrical heat transfer member.

PATENT LITERATURE

Patent Literature 1: Japanese Patent Application Laid-open No. 2014-127515

However, in the reactor disclosed in Patent Literature 1, a complicated member formed in an L shape is required as another transfer member for transferring, to a heat dissipator, the heat transferred to the cylindrical heat transfer member, and therefore, a heat dissipation structure of the reactor becomes complicated, which is a problem.

SUMMARY

The present invention has been made in view of the above, and an object thereof is to provide a refrigeration cycle apparatus capable of improving heat dissipation efficiency of a core without complicating a structure.

To solve the aforementioned problems and achieve the object, a refrigeration cycle apparatus according to the present invention includes: a partition plate that partitions an inside of a housing of an outdoor unit into a blower chamber and a machine chamber; a reactor attached to the partition plate on a side of the machine chamber; a fixing member that fixes the reactor to the partition plate; and a plate-like first heat transfer member provided between the reactor and the partition plate. The first heat transfer member is provided between the partition plate and the reactor, and thermal resistance of the first heat transfer member is smaller than thermal resistance of the fixing member.

The refrigeration cycle apparatus according to the present invention achieves an effect of improving heat dissipation efficiency of a core without complicating a structure.

DETAILED DESCRIPTION

Hereinafter, a refrigeration cycle apparatus according to an embodiment of the present invention will be described in detail with reference to the drawings. The present invention is not limited to the embodiment.

EMBODIMENT

Figure 1:
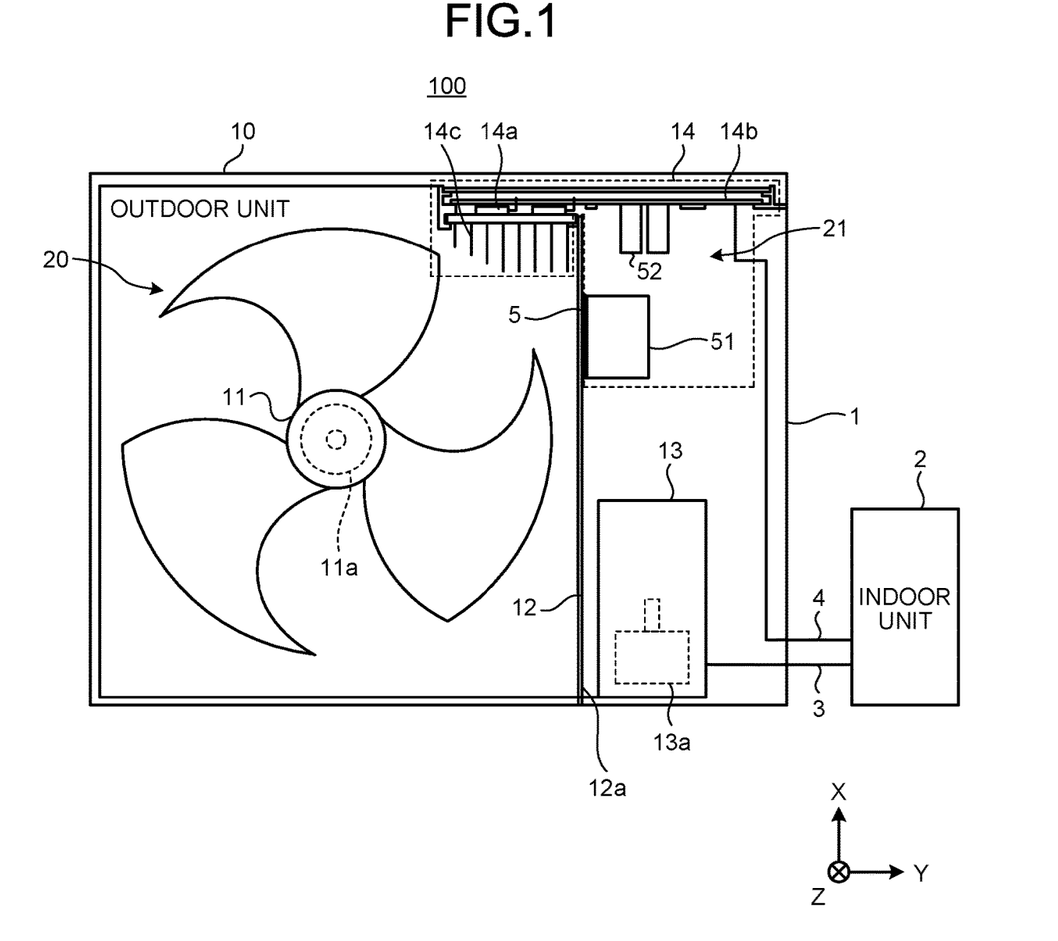
FIG. 1 is a configuration diagram of an air conditioning apparatus that is an example of a refrigeration cycle apparatus according to the present embodiment.

FIG. 1 is a configuration diagram of an air conditioning apparatus that is an example of a refrigeration cycle apparatus according to the present embodiment. An air conditioning apparatus 100 illustrated in FIG. 1 includes an outdoor unit 1, an indoor unit 2, a refrigerant pipe 3 that interconnects the outdoor unit 1 and the indoor unit 2 to each other and through which a refrigerant flows, and an indoor/outdoor wiring 4 that interconnects the outdoor unit 1 and the indoor unit 2 to each other. Power supplied from the indoor unit 2 to the outdoor unit 1 and a signal transmitted between the indoor unit 2 and the outdoor unit 1 are transmitted to the indoor/outdoor wiring 4. In FIG. 1, in right-handed XYZ coordinates, a vertical direction is an X-axis direction, a horizontal direction is a Y-axis direction, and a direction orthogonal to both the X-axis direction and the Y-axis direction is a Z-axis direction.

As illustrated in FIG. 1, the outdoor unit 1 includes a housing 10, a blower fan 11, a fan drive motor 11a that drives the blower fan 11, a partition plate 12 that partitions the inside of the housing 10 into a blower chamber 20 and a machine chamber 21, a compressor 13, a compressor drive motor 13a that drives the compressor 13, and a motor drive unit 14.

The motor drive unit 14 includes a drive circuit 14a that generates an alternating-current voltage for driving the fan drive motor 11a and the compressor drive motor 13a, a circuit board 14b on which the drive circuit 14a is mounted, and a heat dissipation unit 14c that dissipates heat generated in the drive circuit 14a.

The circuit board 14b is provided at an upper end portion of the partition plate 12 in the X-axis direction, and is arranged to extend across the partition plate 12 in the Y-axis direction. An inverter circuit is installed on the circuit board 14b on a side of the blower chamber 20. In the inverter circuit, a temperature of heat generated when driving the fan drive motor 11a and the compressor drive motor 13a is high. A converter circuit and a control circuit are installed on the circuit board 14b on the side of the blower chamber 20. In the converter circuit, a temperature of heat generated when driving the fan drive motor 11a and the compressor drive motor 13a is lower than that in the inverter circuit. The heat dissipation unit 14c is installed on the circuit board 14b on the side of the blower chamber 20 in order to dissipate heat generated in the inverter circuit to the blower chamber 20.

In the blower chamber 20, the blower fan 11 and the fan drive motor 11a are installed. In the machine chamber 21, the compressor 13, a reactor 51, and a capacitor 52 are installed. The reactor 51 and the capacitor 52 constitute a part of the converter circuit described above. The reactor 51 is fixed to a plate surface 12a of the partition plate 12 on a side of the machine chamber 21 in the Y-axis direction. A plate-like first heat transfer member 5 is provided between the plate surface 12a of the partition plate 12 and the reactor 51.

The first heat transfer member 5 is a sheet having insulating properties and high thermal conductivity. Specifically, the first heat transfer member 5 is a member manufactured by mixing particles having high thermal conductivity or powder having high thermal conductivity in an insulating sheet. Examples of a material of the insulating sheet include silicone rubber, polyisobutylene rubber, and acrylic rubber. Examples of a material of particles having high thermal conductivity or powder having high thermal conductivity include aluminum oxide, aluminum nitride, zinc oxide, silica, and mica. The first heat transfer member 5 has flexibility and elasticity in addition to the insulating properties and the high thermal conductivity.

Figure 2:
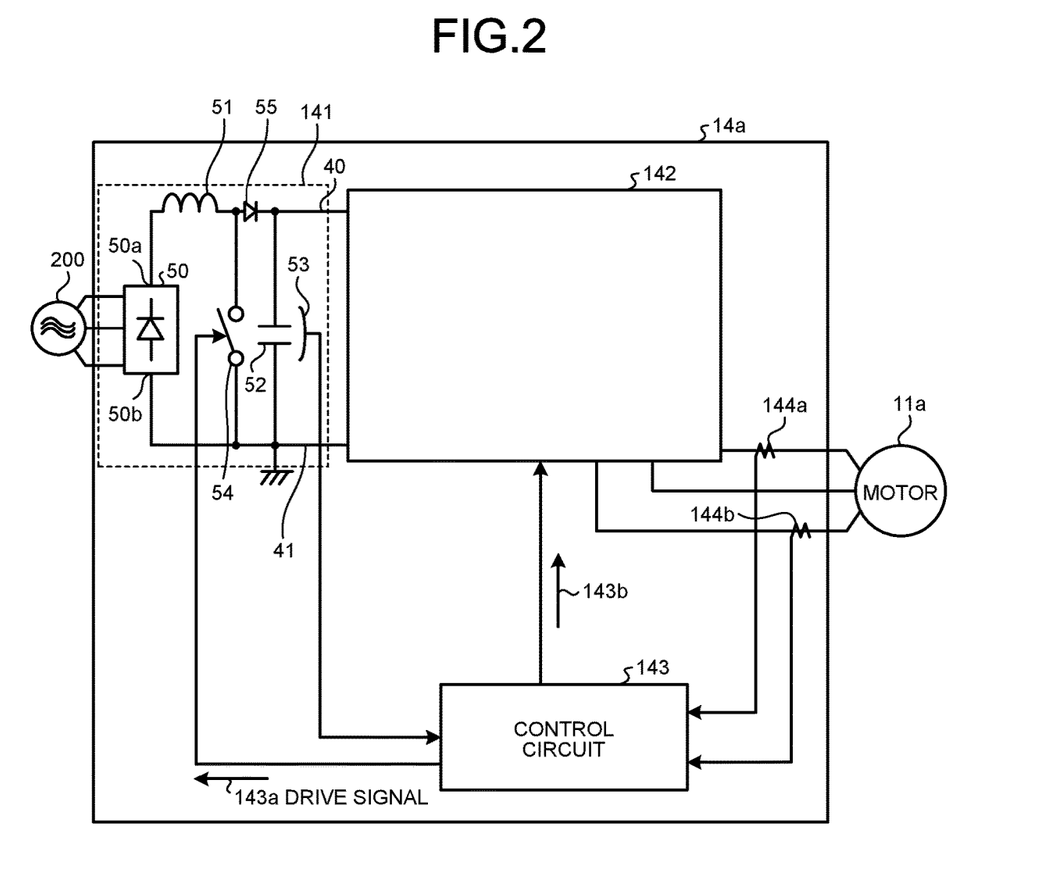
FIG. 2 is a diagram illustrating an example of a drive circuit illustrated in FIG. 1.

FIG. 2 is a diagram illustrating an example of the drive circuit illustrated in FIG. 1. In FIG. 2, the example of the circuit that drives the fan drive motor 11a illustrated in FIG. 1 is illustrated, and illustration of a circuit that drives the compressor drive motor 13a is omitted.

The drive circuit 14a includes a converter circuit 141 that converts an alternating-current voltage of the alternating-current power supply 200 into a direct-current voltage, an inverter circuit 142 that converts a direct-current voltage output from the converter circuit 141 into an alternating-current voltage to drive the fan drive motor 11a, a control circuit 143 that generates and outputs drive signals 143a and 143b for controlling the converter circuit 141 and the inverter circuit 142, and a plurality of current measurement units 144a and 144b that measures a value of a current output from the inverter circuit 142.

The converter circuit 141 includes a rectifier 50 that rectifies the alternating-current voltage supplied from the alternating-current power supply 200, the reactor 51 that functions as a choke coil, a capacitor 52 that smoothes a voltage rectified by the rectifier 50, a voltage detection unit 53 that detects a voltage across the capacitor 52, a switching element 54 connected in parallel to the rectifier 50 via the reactor 51, and a backflow prevention element 55 that prevents a backflow of charges stored in the capacitor 52 to the switching element 54.

The rectifier 50 is a full-wave diode bridge rectifier circuit. One end of the reactor 51 is connected to a positive output end 50a of the rectifier 50, and the other end of the reactor 51 is connected to an anode of the backflow prevention element 55 and one end of the switching element 54. A cathode of the backflow prevention element 55 is connected to one end of the capacitor 52 and a positive direct-current bus 40. The other end of the capacitor 52 is connected to the other end of the switching element 54 and a negative direct-current bus 41. A negative output end 50b of the rectifier 50 is connected to the other end of the switching element 54, the other end of the capacitor 52, and the negative direct-current bus 41.

An operation of the drive circuit 14a will be described. The alternating-current voltage of the alternating-current power supply 200 is applied to the converter circuit 141, and the direct-current voltage converted by the converter circuit 141 is converted into an alternating-current voltage of variable frequency by the inverter circuit 142. The alternating-current voltage output from the inverter circuit 142 rotates a rotor (not illustrated) that constitutes the fan drive motor 11a. The control circuit 143 calculates an output voltage for driving the fan drive motor 11a on the basis of a command of a target rotation speed given from the outside of the drive circuit 14a and currents measured by the current measurement units 144a and 144b. The control circuit 143 generates a PWM signal corresponding to the calculated output voltage, converts the PWM signal into drive signals 143a and 143b capable of driving the switching element 54 and a switching element group (not illustrated) constituting the inverter circuit 142, and outputs the signals.

When the switching element 54 of the converter circuit 141 is turned on by the drive signal 143a output from the control circuit 143, energy is stored in the reactor 51. When the switching element 54 is turned off thereafter, the backflow prevention element 55 conducts and the energy stored in the reactor 51 is output to the inverter circuit 142. By switching the switching element 54 on and off repeatedly, the direct-current voltage output from the rectifier 50 is converted into a voltage having a different value.

Here, the reactor 51 is configured by combining a winding and a core. When a resistance value of the winding of the reactor 51 is denoted by R and a current flowing through the winding of the reactor 51 is denoted by I, copper loss of the reactor 51 is expressed by $R*I^2$. The resistance value R includes direct-current resistance to a direct-current component of the current I and alternating-current resistance to a high frequency component. The alternating-current resistance increases with an increase in frequency due to a skin effect. That is, the further the frequency increases, the further the copper loss of the winding increases. On the other hand, in the core of the reactor 51, eddy-current loss, which is iron loss, and hysteresis loss occur. Therefore, in the reactor 51, heat is generated due to copper loss and iron loss. In a case where the capacitor 52 is an electrolytic capacitor, when electrolytic solution in the electrolytic capacitor evaporates due to an influence of the heat generated in the reactor 51, the impedance of the electrolytic capacitor increases. The increase in the impedance of the electrolytic capacitor leads to a decrease in voltage conversion efficiency in the converter circuit 141.

In the present embodiment, the first heat transfer member 5 is provided between the plate surface 12a of the partition plate 12 and the reactor 51, and thereby the reactor 51 is effectively cooled. By cooling the reactor 51, the heat dissipation properties of the winding and the core of the reactor 51 are enhanced, an influence of the heat generated as a result of the copper loss and the iron loss on the capacitor 52 is reduced, and an influence on electronic components other than the capacitor 52 is also reduced.

Figure 3:
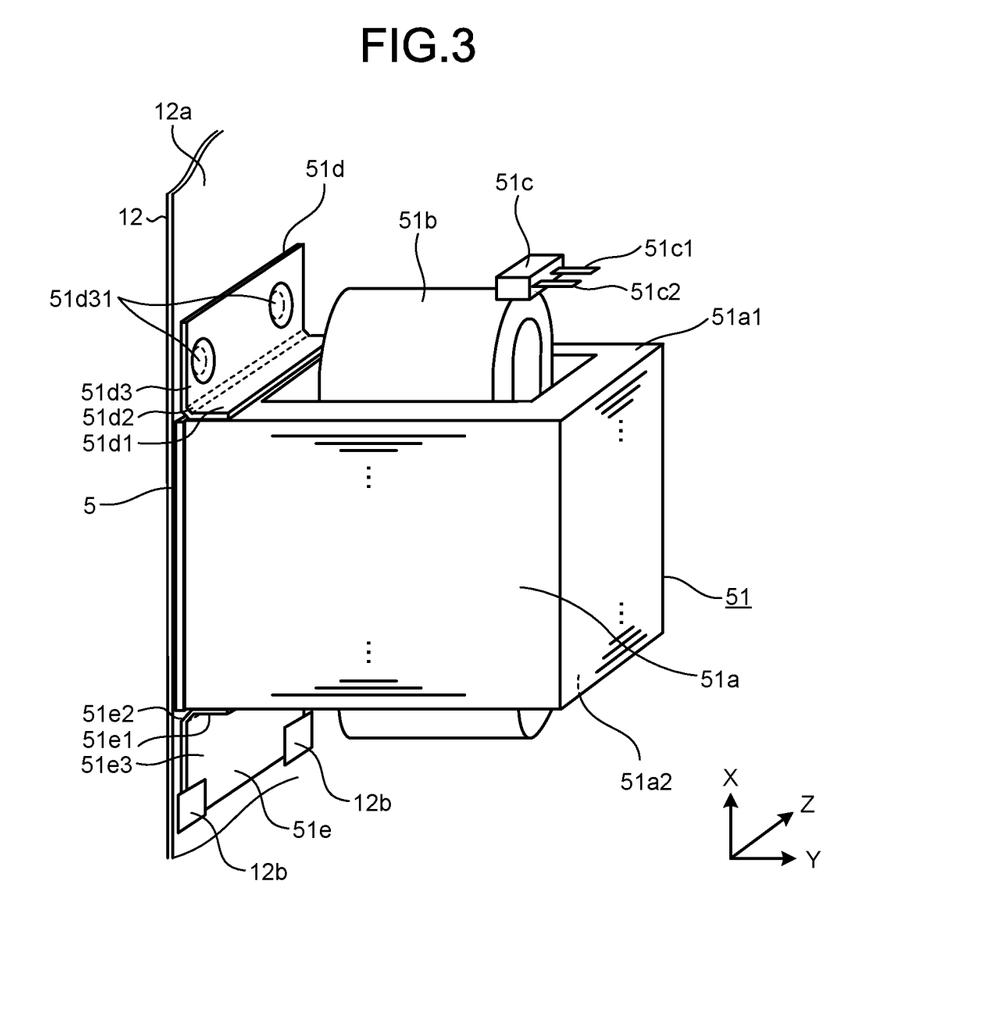
FIG. 3 is an enlarged view of a reactor and a first heat transfer member provided on a partition plate of FIG. 1.

FIG. 3 is an enlarged view of the reactor and the first heat transfer member provided on the partition plate of FIG. 1. As illustrated in FIG. 3, the reactor 51 includes a core 51a configured by laminating a plurality of electromagnetic steel plates in the X-axis direction, a winding 51b wound around the core 51a, a terminal block 51c electrically connected to the winding 51b, and a pair of fixing members 51d and 51e for fixing the core 51a to the plate surface 12a of the partition plate 12.

Examples of a material of each fixing member of the pair of fixing members 51d and 51e include an aluminum alloy, an austenitic stainless alloy, a copper alloy, cast iron, steel, and an iron alloy. The thermal conductivity of the first heat transfer member 5 is higher than the thermal conductivity of the pair of fixing members 51d and 51e. In addition, the thermal resistance of the first heat transfer member 5 is smaller than the thermal resistance of the pair of fixing members 51d and 51e.

A pair of conductive pins 51c1 and 51c2 is provided on the terminal block 51c. The conductive pin 51c1 is electrically connected to one end of a wire constituting the winding 51b, and is electrically connected also to the positive output end 50a of the rectifier 50 illustrated in FIG. 2. The conductive pin 51c2 is electrically connected to the other end of the wire constituting the winding 51b, and is electrically connected also to the negative output end 50b of the rectifier 50 illustrated in FIG. 2.

The fixing member 51d is a member formed in an L shape by bending a flat plate material. The fixing member 51d includes a base 51d1 in contact with one end face 51a1 of the core 51a in the X-axis direction, a bent portion 51d2 bent in the X-axis direction from an end portion of the base 51d1, and a flange portion 51d3 extending in the X-axis direction from the bent portion 51d2. The direction in which the flange portion 51d3 extends is a direction opposite to the core 51a from the base 51d1. The base 51d1 is welded to the one end face 51a1 of the core 51a.

A pair of through holes 51d31 penetrating in the Y-axis direction is formed in the flange portion 51d3. Regarding the pair of through holes 51d31, the through holes 51d31 are each separated from each other in the Z-axis direction. Fastening members (not illustrated) are inserted into the pair of through holes 51d31, and the fastening members are screwed into the partition plate 12, and thereby the reactor 51 is fixed to the partition plate 12.

The fixing member 51e is a member formed in an L shape by bending a flat plate material. The fixing member 51e includes a base 51e1 in contact with the other end face 51a2 of the core 51a in the X-axis direction, a bent portion 51e2 bent in the X-axis direction from an end portion of the base 51e1, and a flange portion 51e3 extending in the X-axis direction from the bent portion 51e2. The direction in which the flange portion 51e3 extends is a direction opposite to the core 51a from the base 51e1. The base 51e1 is welded to the other end face 51a2 of the core 51a.

A pair of latching members 12b for holding the flange portion 51e3 is provided on the plate surface 12a of the partition plate 12. Regarding the pair of latching members 12b, the latching members 12b are each separated from each other in the Z-axis direction.

A procedure for fixing the reactor 51 to the partition plate 12 is as follows.

(1) The first heat transfer member 5 is attached to the partition plate 12.

(2) Corner portions of the flange portion 51e3 are inserted into a gap between the plate surface 12a of the partition plate 12 and the latching members 12b. As a result, the flange portion 51e3 is latched by the pair of latching members 12b.

(3) The fastening members inserted into the pair of through holes 51d31 are screwed into the partition plate 12, and thereby the fixing member 51d of the reactor 51 is fixed to the partition plate 12. In addition, by the fastening members screwed thereinto, a space between the core 51a connected to the fixing member 51d and the partition plate 12 is narrowed, and the first heat transfer member 5 is crushed in the Y-axis direction. That is, constant pressure is applied to the first heat transfer member 5.

Here, when the thickness of the first heat transfer member 5 in the Y-axis direction before being crushed is denoted by "T", and the width of a gap between the core 51a and the plate surface 12a of the partition plate 12 in a case where the reactor 51 is fixed to the partition plate 12 without providing the first heat transfer member 5 is denoted by "W", the thickness T of the first heat transfer member 5 is larger than the width W of the gap.

Since the first heat transfer member 5 is made of a flexible material, crushing the first heat transfer member 5 brings the first heat transfer member 5 into close contact with the plate surface 12a of the partition plate 12, and brings the first heat transfer member 5 into close contact with the core 51a. Therefore, the core 51a, the first heat transfer member 5, and the partition plate 12 are thermally connected, and the core 51a, the pair of fixing members 51d and 51e, and the partition plate 12 are thermally connected. Consequently, the thermal resistance between the partition plate 12 and the core 51a is reduced, and the heat dissipation efficiency of the core 51a is improved as compared with a case where the core 51a is fixed to the partition plate 12 using the pair of fixing members 51d and 51e without using the first heat transfer member 5.

The structure for fixing the core 51a to the partition plate 12 is not limited to the illustrated example, as long as the core 51a can be fixed so that constant pressure is applied to the first heat transfer member 5. The pair of fixing members 51d and 51e may be welded to the partition plate 12 in a state where the pair of fixing members 51d and 51e are pressed against the partition plate 12 so that constant pressure is applied to the first heat transfer member 5.

The area of the first heat transfer member 5, in a plan view of the first heat transfer member 5 from the Y-axis direction, is preferably similar to the area of the end face of the core 51a on a side of the partition plate 12, but there is no limitation thereto as long as the first heat transfer member 5 is in surface contact with the core 51a, and the area of the first heat transfer member 5 may be slightly larger than the area of the end face of the core 51a on the side of the partition plate 12, or may be slightly smaller than the area of the end face of the core 51a on the side of the partition plate 12.

Figure 4:
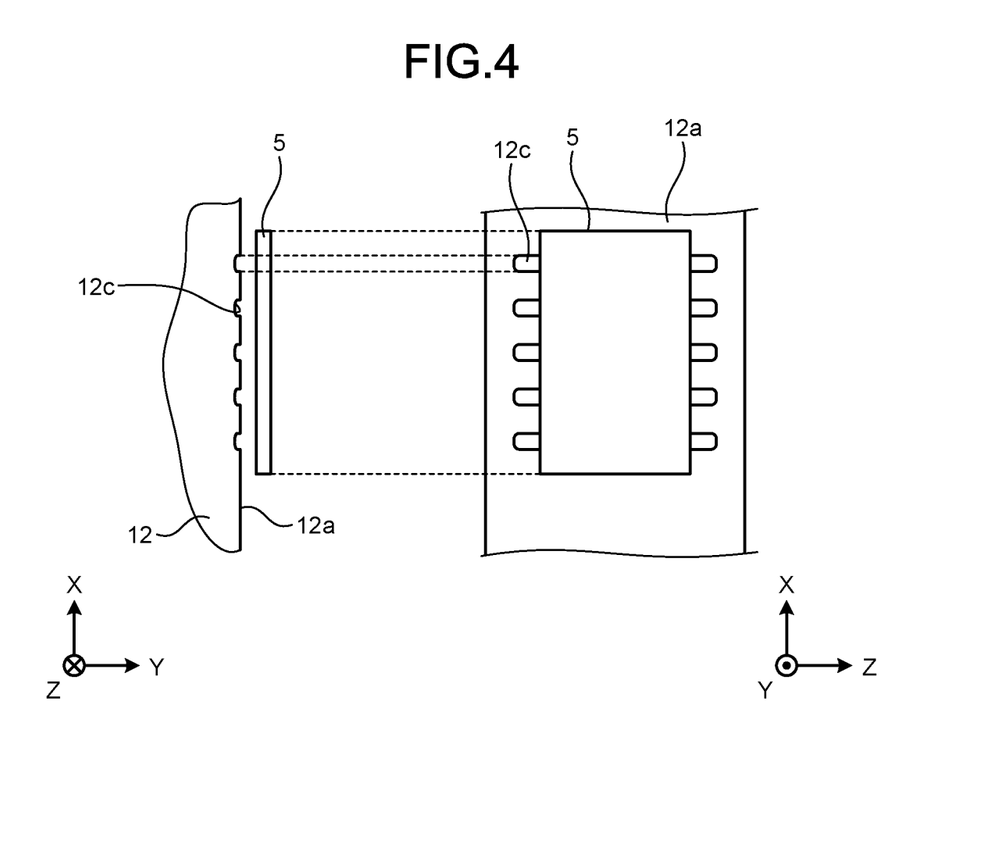
FIG. 4 is a view for explaining a structure in which a plurality of grooves is provided on a plate surface of the partition plate illustrated in FIG. 3 to release air bubbles having entered between the partition plate and the first heat transfer member.

FIG. 4 is a view for explaining a structure in which a plurality of grooves is provided on the plate surface of the partition plate illustrated in FIG. 3 to release air bubbles having entered between the partition plate and the first heat transfer member. As illustrated in FIG. 4, a plurality of grooves 12c wider than the first heat transfer member 5 is formed on the plate surface 12a of the partition plate 12. The grooves 12c are formed in a portion of the plate surface 12a of the partition plate 12 facing the first heat transfer member 5. Each of the grooves 12c is separated from each other in the X-axis direction and extends in the Z-axis direction. The depth of each groove 12c in the Y-axis direction is set to be a dimension which enables the first heat transfer member 5 to which pressure has been applied to contact the bottom of the groove 12c.

The first heat transfer member 5 is provided on the partition plate 12 so as to cover a part of a region from one end to the other end of each groove 12c in the Z-axis direction.

When the grooves 12c are not formed, air bubbles may enter between the first heat transfer member 5 and the partition plate 12, the thermal conductivity may be decreased by the air bubbles, which may result in difficulties in lowering the temperature of the core 51a illustrated in FIG. 3. By providing the grooves 12c in the partition plate 12 as illustrated in FIG. 4, even when air bubbles enter between the first heat transfer member 5 and the partition plate 12, the air bubbles can be released from the grooves 12c.

Next, transfer of heat will be described. When a current flows in the winding 51b illustrated in FIG. 3, the above-described iron loss and copper loss occur, and the core 51a and the winding 51b generate heat due to these losses, and thereby the temperatures of the core 51a and the winding 51b rise.

The heat generated in the winding 51b is transferred to a space around the reactor 51 and the core 51a, and thereby the temperature of the space around the reactor 51 and the temperature of the core 51a rise. When the temperature of the winding 51b becomes equal to the temperature of the space around the reactor 51 or the temperature of the core 51a, the temperature rise in the winding 51b stops and the temperature of the winding 51b exhibits a constant value.

On the other hand, the heat generated in the core 51a and the heat transferred from the winding 51b to the core 51a are transferred to the space around the reactor 51, the pair of fixing members 51d and 51e, and the first heat transfer member 5. The heat transferred to the space around the reactor 51, the pair of fixing members 51d and 51e, and the first heat transfer member 5 raise the temperature of the space around the reactor 51, the temperature of the pair of fixing members 51d and 51e, and the temperature of the first heat transfer member 5. When the temperature of the core 51a becomes equal to the temperature of the space around the reactor 51, the temperature of the pair of fixing members 51d and 51e, or the temperature of the first heat transfer member 5, the temperature rise in the core 51a stops and the temperature of the core 51a exhibits a constant value.

The heat transferred from the core 51a to the pair of fixing members 51d and 51e is transferred to the space around the reactor 51 and the partition plate 12. In addition, the heat transferred from the core 51a to the first heat transfer member 5 is transferred to the partition plate 12. As described above, since the thermal conductivity of the first heat transfer member 5 is higher than the thermal conductivity of the pair of fixing members 51d and 51e, most of the heat of the core 51a is transferred to the partition plate 12 via the first heat transfer member 5.

The rotation of the blower fan 11 illustrated in FIG. 1 causes a flow of air in the blower chamber 20, thereby suppressing development of a temperature boundary layer formed on a surface of the partition plate 12. As a result, the amount of heat exchange between the air flowing into the blower chamber 20 and the partition plate 12 is improved, the partition plate 12 is cooled, and the core 51a is effectively cooled.

In the present embodiment, since the temperature rise in the core 51a is suppressed as compared with the case where the first heat transfer member 5 is not used, the core 51a can be manufactured by using a material of which iron loss is large but which is inexpensive, and the manufacturing cost of the core 51a is reduced.

Even in a case where a slight gap is generated between the fixing member 51d and the partition plate 12 because the fastening of the fastening member inserted into the fixing member 51d is not perfect, the heat of the core 51a can be effectively transferred by the first heat transfer member 5 to the partition plate 12 in the present embodiment. Therefore, in the present embodiment, the core 51a can be effectively cooled even when an attachment failure of the fixing member 51d occurs, so that the reliability of the reactor 51 is improved.

Even when there is a slight distortion in each fixing member of the pair of fixing members 51d and 51e or a slight distortion in the partition plate 12, the first heat transfer member 5 made of a flexible member is in contact with the core 51a and the partition plate 12, so that the heat of the core 51a can be effectively transferred to the partition plate 12. Therefore, in the present embodiment, the core 51a can be effectively cooled without requiring a high manufacturing accuracy for the pair of fixing members 51d and 51e or the partition plate 12, so that the manufacturing cost of the pair of fixing members 51d and 51e or the partition plate 12 can be reduced, and the reliability of the reactor 51 is improved.

Figure 5:
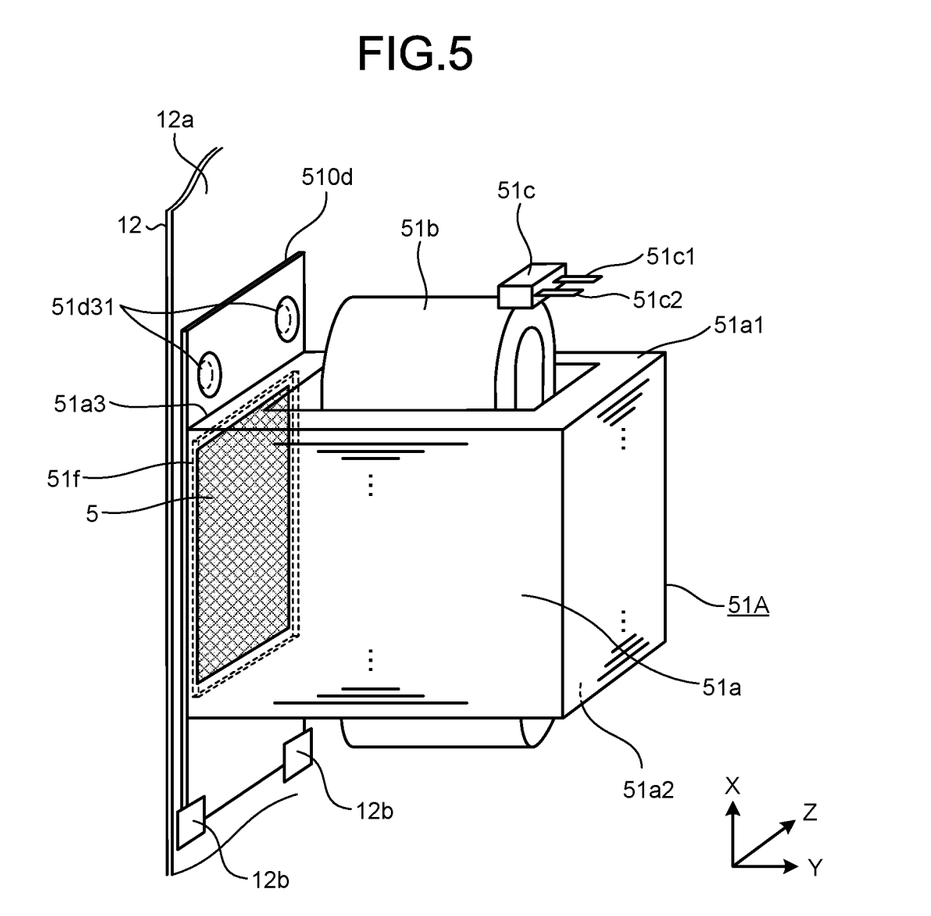
FIG. 5 is a view illustrating a first modification of the reactor illustrated in FIG. 3.

FIG. 5 is a view illustrating a first modification of the reactor illustrated in FIG. 3. The difference between the reactor 51 illustrated in FIG. 3 and a reactor 51A illustrated in FIG. 5 resides in that instead of the pair of fixing members 51d and 51e illustrated in FIG. 3, a plate-like fixing member 510d is used in the reactor 51A.

The fixing member 510d is welded to the core 51a. A welding portion of the fixing member 510d to the core 51a is one end face 51a3 of the core 51a on the side of the partition plate 12 in the Y-axis direction. Examples of a material of the fixing member 510d include an aluminum alloy, an austenitic stainless alloy, a copper alloy, cast iron, steel, and an iron alloy. The thermal conductivity of the first heat transfer member 5 is higher than the thermal conductivity of the fixing member 510d.

An opening 51f is formed in the fixing member 510d. The opening 51f is formed in a region obtained by projecting the one end face 51a3 of the core 51a in the Y-axis direction toward the partition plate 12. The first heat transfer member 5 is accommodated in the opening 51f.

In a state where the first heat transfer member 5 is accommodated in the opening 51f, fastening members (not illustrated) are inserted into the pair of through holes 51d31, and the fastening members are screwed into the partition plate 12, and thereby the fixing member 510d is fixed to the partition plate 12. At that time, pressure is applied to the first heat transfer member 5 in the Y-axis direction, and the first heat transfer member 5 is crushed.

When the thickness of the first heat transfer member 5 in the Y-axis direction before being crushed is denoted by "T" and the thickness of the fixing member 510d in the Y-axis direction is denoted by "T1", the thickness T of the first heat transfer member 5 is larger than the thickness T1 of the fixing member 510d. Since the first heat transfer member 5 is made of a flexible material, crushing the first heat transfer member 5 in the Y-axis direction brings the first heat transfer member 5 into close contact with the plate surface 12a of the partition plate 12, and brings the first heat transfer member 5 into close contact with the core 51a. Therefore, the thermal resistance between the partition plate 12 and the core 51a is reduced, and the heat dissipation efficiency of the core 51a is improved as compared with a case where the core 51a is fixed to the partition plate 12 using the fixing member 510d without using the first heat transfer member 5.

As described above, in the reactor 51A illustrated in FIG. 5, an effect equivalent to that obtained in the reactor 51 illustrated in FIG. 3 can be obtained, and the core 51a can be fixed using one plate-like fixing member 510d, so that the structure of the reactor 51 can be simplified.

Figure 6:
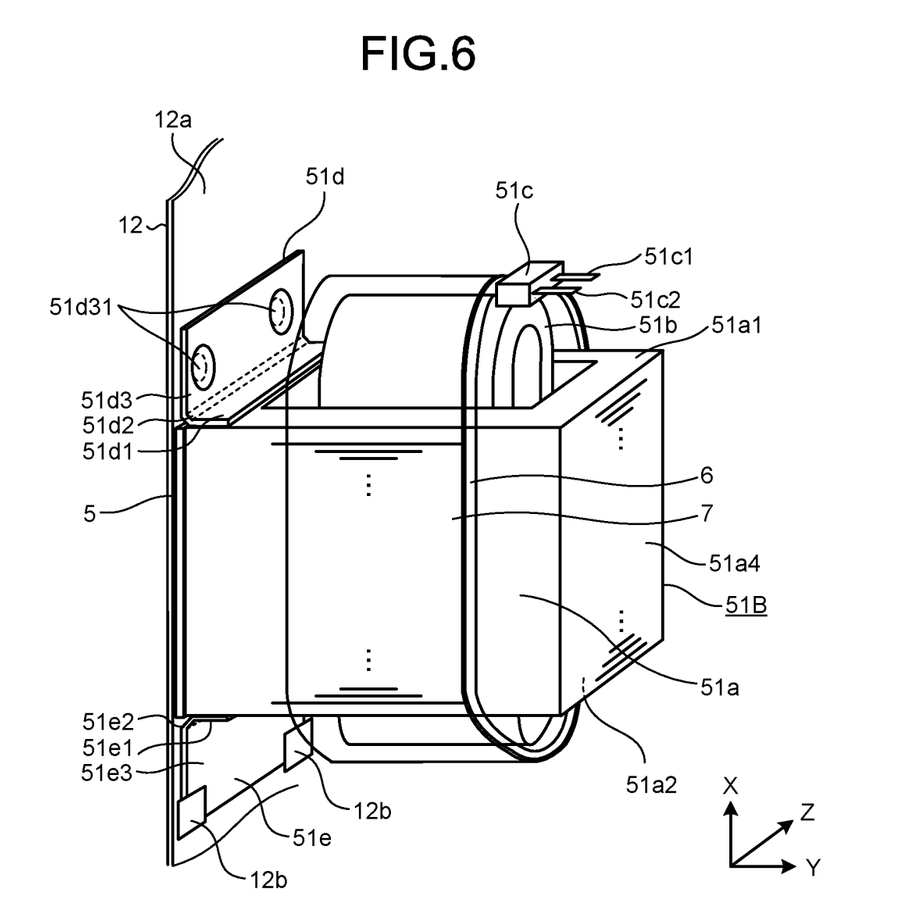
FIG. 6 is a view illustrating a second modification of the reactor illustrated in FIG. 3.

FIG. 6 is a view illustrating a second modification of the reactor illustrated in FIG. 3. The difference between the reactor 51 illustrated in FIG. 3 and a reactor 51B illustrated in FIG. 6 resides in that a second heat transfer member 6 and a heat insulating member 7 that covers the periphery of the second heat transfer member 6 are used in the reactor 51B illustrated in FIG. 6.

The second heat transfer member 6 covers the outer peripheral surface of the winding 51b projecting in the X-axis direction from each of the one end face 51a1 and the other end face 51a2 of the core 51a, and covers both end faces of the core 51a in the Z-axis direction. The inner peripheral surface of the second heat transfer member 6 is in contact with a part of the outer peripheral surface of the winding 51b and is in contact with both end faces of the core 51a in the Z-axis direction. The outer peripheral surface of the second heat transfer member 6 is in contact with the inner peripheral surface of the heat insulating member 7.

As a material of the heat insulating member 7, silica aerogel can be exemplified. The heat insulating member 7 is a fiber sheet containing silica aerogel, and is a flexible and thin heat insulating member. The thickness of the heat insulating member 7 is around 0.2 mm. The thermal conductivity of the heat insulating member 7 is lower than the thermal conductivity of each of the first heat transfer member 5 and the second heat transfer member 6. The thermal resistance of the heat insulating member 7 is larger than the thermal resistance of each of the first heat transfer member 5 and the second heat transfer member 6.

Since the heat insulating member 7 is a thin member, even when the space around the reactor 51B is narrow, there arises no problem in fixing the reactor 51B to the partition plate 12. The thickness of the heat insulating member 7 is not limited to around 0.2 mm, and may be thinner than 0.2 mm or thicker than 0.2 mm in consideration of the size of the space around the reactor 51B. The thickness of the heat insulating member 7 may be thinner than 0.2 mm or thicker than 0.2 mm in consideration of the thermal resistance between the partition plate 12 and the core 51a, that is, a required amount of heat insulation.

As the second heat transfer member 6, it is satisfactory as long as the second heat transfer member 6 is manufactured by using a material having thermal conductivity higher than the thermal conductivity of the heat insulating member 7, and the second heat transfer member 6 may be those manufactured by using a material having the same thermal conductivity as the thermal conductivity of the first heat transfer member 5, or may be those manufactured by using a material having different thermal conductivity from the thermal conductivity of the first heat transfer member 5 in consideration of an attachment position of the reactor 51B or a required heat insulation amount. The thickness of the second heat transfer member 6 is determined in consideration of the amount of heat generated in the winding 51b and the thermal conductivity between the winding 51b and the core 51a.

Next, transfer of heat will be described. The heat generated in the winding 51b is transferred to the space around the reactor 51B, the core 51a, and the second heat transfer member 6, and thereby the temperature of the space around the reactor 51B, the temperature of the core 51a, and the temperature of the second heat transfer member 6 rise.

The temperature rise in the space around the reactor 51B causes the temperature of the motor drive unit 14 illustrated in FIG. 1 to rise. Electronic components that constitute the motor drive unit 14 require heat resistance measures against the temperature rise, and the manufacturing cost of the motor drive unit 14 may be increased due to the measures.

In the reactor 51B illustrated in FIG. 6, the second heat transfer member 6 is covered with the heat insulating member 7, so that the radiation of heat generated in the winding 51b to the space around the reactor 51B is suppressed. In the reactor 51B illustrated in FIG. 6, an end portion of the winding 51b in the Y-axis direction is exposed, and therefore, it is desirable to cover the end portion of the winding 51b in the Y-axis direction as well with the second heat transfer member 6 and the heat insulating member 7 in order to further suppress the radiation of heat to the space around the reactor 51B.

On the other hand, the heat generated in the core 51a, the heat transferred directly from the winding 51b to the core 51a, and the heat transferred from the winding 51b to the core 51a via the second heat transfer member 6 are transferred to the space around the reactor 51B, the pair of fixing members 51d and 51e, and the first heat transfer member 5. The heat transferred to the first heat transfer member 5 is transferred to the partition plate 12.

In the reactor 51B illustrated in FIG. 6, both end faces of the core 51a in the Z-axis direction are partially exposed, and another end face 51a4 of the core 51a in the Y-axis direction is exposed. Consequently, in order to further suppress the radiation of heat to the space around the reactor 51B, it is desirable to cover the entirety of both end faces of the core 51a in the Z-axis direction and the other end face 51a4 of the core 51a in the Y-axis direction as well with the second heat transfer member 6 and the heat insulating member 7.

Although the temperature of the winding 51b varies depending on the thickness of the second heat transfer member 6, the thermal conductivity of the second heat transfer member 6, the amount of wind that hits the partition plate 12, and the temperature of the wind that hits the partition plate 12, if the temperature of the winding 51b can be lowered, the reactor 51B can be miniaturized.

In the reactor 51B illustrated in FIG. 6, the amount of heat transferred to the space around the reactor 51B can be suppressed by the heat insulating member 7, so that it is possible to decrease measures against heat with respect to electronic components that constitute the motor drive unit 14, the service life of the electronic components is improved, and the reliability of the motor drive unit 14 is improved, as compared with a case where the heat insulating member 7 is not provided. In addition, in the reactor 51B illustrated in FIG. 6, even if requirements for the temperature of the electronic components that constitute the motor drive unit 14 are relaxed, there is a possibility that the service life of the electronic components in the case where the heat insulating member 7 is not provided can be secured, and therefore, the manufacturing cost of the motor drive unit 14 can be reduced relatively. These effects are similarly obtained even in a case where the temperature of the winding 51b becomes high when the motor drive unit 14 operates in a high load region.

Although the second heat transfer member 6 is used in the reactor 51B illustrated in FIG. 6, only the heat insulating member 7 may be used in the reactor 51B without using the second heat transfer member 6. In such a configuration, the temperature of the winding 51b is higher than the temperature of the winding 51b when the second heat transfer member 6 is used, but the heat insulating member 7 can suppress the amount of heat transferred to the space around the reactor 51B, so that the influence of heat on the electronic components that constitute the motor drive unit 14 can be reduced. When the second heat transfer member 6 is not used, the reactor 51B cannot be miniaturized, but the manufacturing cost of the reactor 51B can be reduced as compared with a case where the second heat transfer member 6 is used in combination.

When the heat insulating member 7 is provided on the outer peripheral surface of the second heat transfer member 6, it is desirable to provide the heat insulating member 7 so that constant pressure is applied to the outer peripheral surface of the second heat transfer member 6. As a result, contact pressure between the second heat transfer member 6 and the core 51a is improved, and contact pressure between the second heat transfer member 6 and the winding 51b is improved, so that it can be expected that the thermal resistance between the second heat transfer member 6 and the core 51a is lowered, and also the thermal resistance between the second heat transfer member 6 and the winding 51b is lowered. Therefore, the thermal conductivity among the winding 51b, the core 51a, the second heat transfer member 6, and the first heat transfer member 5 is improved, and the temperature of the reactor 51B can be further reduced.

As described above, in the reactor 51B illustrated in FIG. 6, a heat transfer path through the second heat transfer member 6 is added, so that the heat generated in the reactor 51B is efficiently transferred to the partition plate 12, and the temperature of the reactor 51B can be further reduced. In addition, in the reactor 51B illustrated in FIG. 6, the radiation of heat to the space around the reactor 51B is suppressed, so that current capacity can be improved without increasing the cost while keeping temperature rating of the motor drive unit 14 constant. Therefore, the capability of the air conditioning apparatus 100 can be improved, and the air conditioning apparatus 100 highly compatible with outside air can be realized while keeping the temperature rating and the current capacity of the motor drive unit 14 constant.

Figure 7:
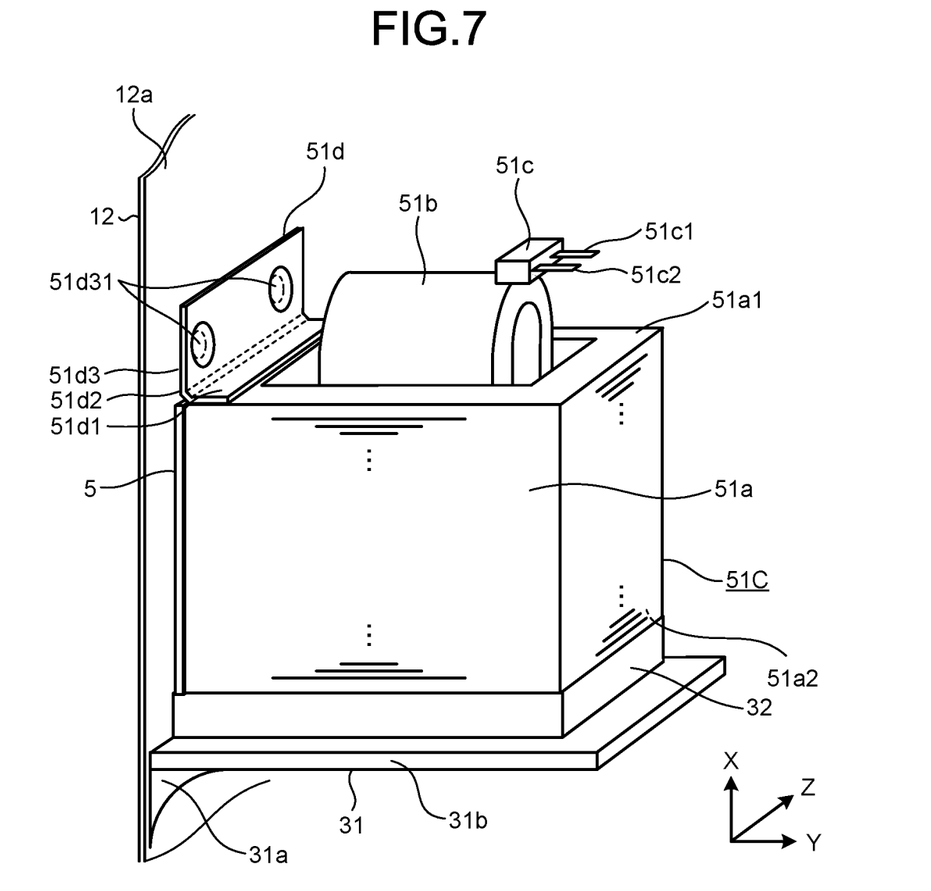
FIG. 7 is a view illustrating a third modification of the reactor illustrated in FIG. 3.

FIG. 7 is a view illustrating a third modification of the reactor illustrated in FIG. 3. The difference between the reactor 51 illustrated in FIG. 3 and a reactor 51C illustrated in FIG. 6 resides in that, instead of the fixing member 51e illustrated in FIG. 3, a third heat transfer member 32 is used in the reactor 51C.

A reactor support 31 is fixed to the partition plate 12. Examples of a material of the reactor support 31 include an aluminum alloy, an austenitic stainless alloy, a copper alloy, cast iron, steel, and an iron alloy. The reactor support 31 includes a fixing member 31a fixed to the partition plate 12 and a support member 31b extending in the Y-axis direction from the fixing member 31a. The support member 31b is provided on the core 51a on a side of the other end face 51a2 in the X-axis direction.

The third heat transfer member 32 is provided between the support member 31b and the other end face 51a2 of the core 51a. One end face of the third heat transfer member 32 in the X-axis direction is in contact with the other end face 51a2 of the core 51a, and the other end face of the third heat transfer member 32 in the X-axis direction is in contact with the support member 31b. The winding 51b is in contact with an inner side of the third heat transfer member 32. The thermal conductivity of the third heat transfer member 32 is higher than the thermal conductivity of the fixing member 51d and is higher than the thermal conductivity of the reactor support 31. The thermal resistance of the third heat transfer member 32 is smaller than the thermal resistance of the fixing member 51d and is smaller than the thermal resistance of the reactor support 31.

Next, transfer of heat will be described. The heat generated in the winding 51b is transferred to a space around the reactor 51C and the third heat transfer member 32. In addition, the heat generated in the winding 51b is transferred directly from the winding 51b to the core 51a and is also transferred to the core 51a via the third heat transfer member 32. As a result, the temperature of the space around the reactor 51C, the temperature of the third heat transfer member 32, and the temperature of the core 51a rise. The other end face 51a2 of the core 51a is in contact with the third heat transfer member 32, the inner side of the third heat transfer member 32 is in contact with the core 51a, and the end face of the support member 31b in the X axis direction is in contact with the third heat transfer member 32, so that the heat generated in the winding 51b is efficiently transferred to the partition plate 12.

On the other hand, the heat generated in the core 51a and the heat transferred from the winding 51b to the core 51a are transferred to the space around the reactor 51C, the third heat transfer member 32, and the first heat transfer member 5. The heat transferred to the space around the reactor 51C, the third heat transfer member 32, and the first heat transfer member 5 raise the temperature of the space around the reactor 51C, the temperature of the third heat transfer member 32, and the temperature of the first heat transfer member 5. The heat transferred from the core 51a to the third heat transfer member 32 is transferred to the space around the reactor 51C and the partition plate 12. In addition, the heat transferred from the core 51a to the first heat transfer member 5 is transferred to the partition plate 12.

As described above, in the reactor 51C illustrated in FIG. 7, the heat generated in the reactor 51C can be transferred to the partition plate 12 via the two heat transfer members, so that the thermal resistance between the partition plate 12 and the core 51a is further reduced and the heat dissipation efficiency of the core 51a is improved.

Figure 8:
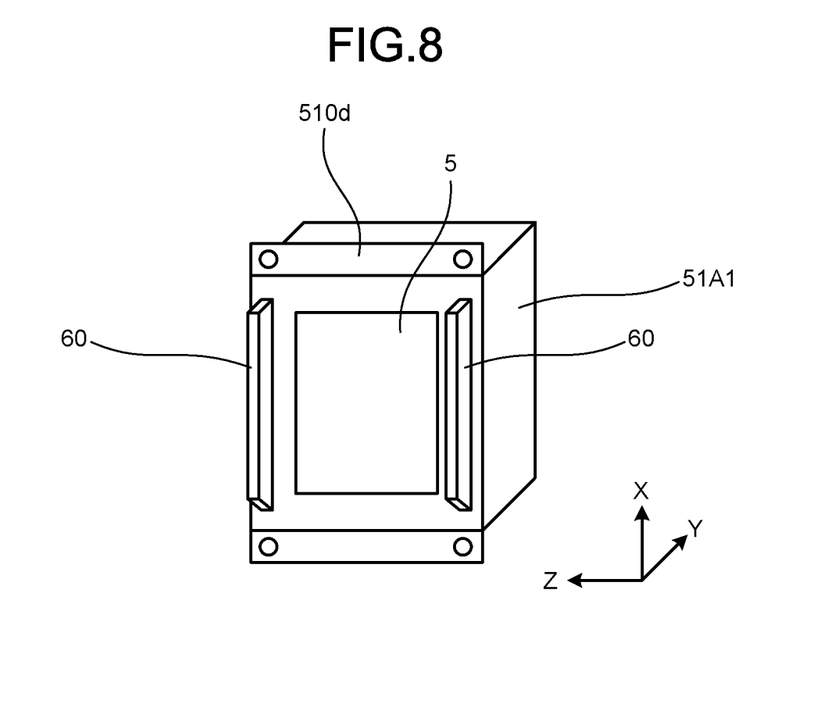
FIG. 8 is a view illustrating a modification of the reactor illustrated in FIG. 5.
Figure 9:
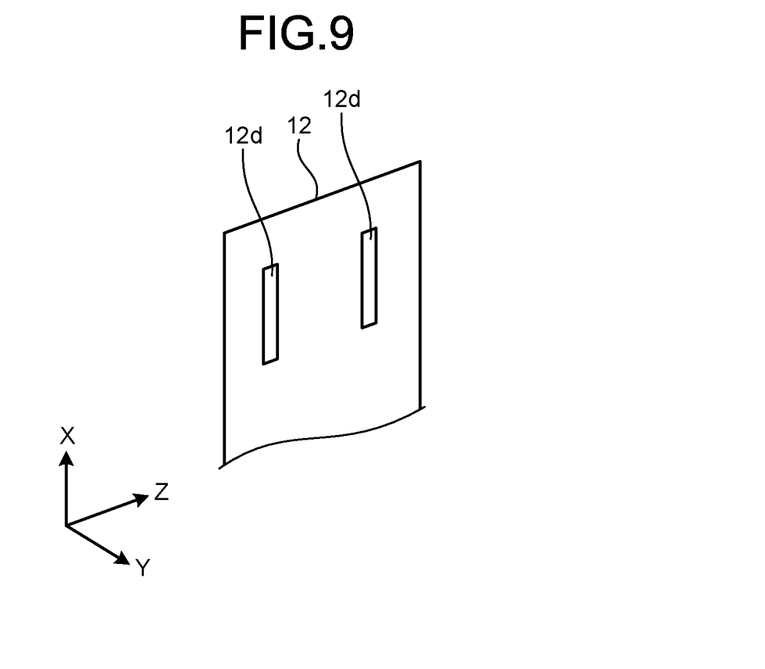
FIG. 9 is a perspective view of a partition plate in which insertion holes for heat transfer member protection plates illustrated in FIG. 8 are formed.

FIG. 8 is a view illustrating a modification of the reactor illustrated in FIG. 5. FIG. 9 is a perspective view of the partition plate in which insertion holes for heat transfer member protection plates illustrated in FIG. 8 are formed. In a reactor 51A1 illustrated in FIG. 8, a pair of heat transfer member protection plates 60 is provided on the plate-like fixing member 510d. As illustrated in FIG. 9, a pair of insertion holes 12d into which the heat transfer member protection plates 60 illustrated in FIG. 8 are inserted is formed in the partition plate 12. The pair of insertion holes 12d is formed at a position where the heat transfer member protection plates 60 are inserted only when the reactor 51A1 is attached to a specific region of the partition plate 12.

As illustrated in FIG. 8, regarding the pair of the heat transfer member protection plates 60, the heat transfer member protection plates 60 are each separated from each other, and the heat transfer member protection plates 60 each extend in the X-axis direction. The length of each heat transfer member protection plate 60 in the X-axis direction is equal to the length of each insertion hole 12d illustrated in FIG. 9 in the X-axis direction. The height of each heat transfer member protection plate 60 in the Y-axis direction is larger than the thickness of the first heat transfer member 5 in the Y-axis direction.

When the reactor 51A1 is attached to the partition plate 12, first, the first heat transfer member 5 is attached to the reactor 51A1, and then the heat transfer member protection plates 60 are inserted into the insertion holes 12d of the partition plate 12. As a result, the first heat transfer member 5 contacts the partition plate 12. Thereafter, pressure is applied to the first heat transfer member 5, so that the first heat transfer member 5 is brought into close contact with the reactor 51A1.

Because there exists not only a flat surface but also an uneven surface in a portion other than the specific region of the partition plate 12, when the reactor 51A1 is attached to a portion other than the specific region of the partition plate 12, the first heat transfer member 5 is pressed against the uneven surface of the partition plate 12, and the first heat transfer member 5 is deformed. When deterioration of the first heat transfer member 5 progresses due to this deformation, the thermal conductivity decreases, and therefore, the first heat transfer member 5 needs to be replaced.

The heat transfer member protection plates 60 are provided on the reactor 51A1 illustrated in FIG. 8, and therefore when the reactor 51A1 is about to be fixed to the portion other than the specific region of the partition plate 12, that is, the portion of the partition plate 12 where the insertion holes 12d are not formed, a tip of each heat transfer member protection plate 60 in the Y-axis direction contacts the partition plate 12. Consequently, the first heat transfer member 5 does not contact the partition plate 12. When the reactor 51A1 is fixed to a reactor attachment surface of the partition plate 12 in which the insertion holes 12d are formed, the first heat transfer member 5 contacts the partition plate 12, and the heat dissipation efficiency of the core 51a is improved.

Figure 10:
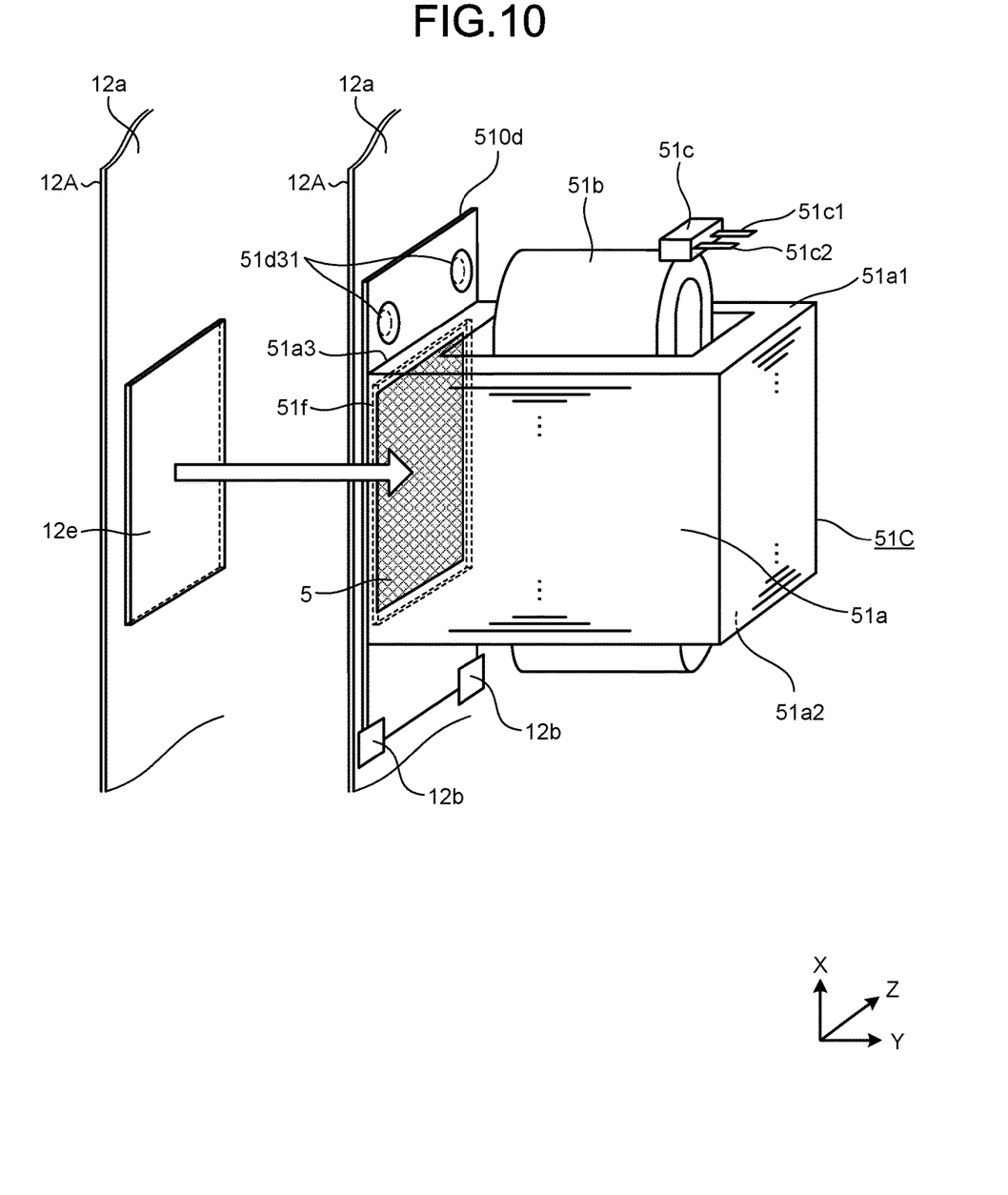
FIG. 10 is a view illustrating an example in which the reactor of FIG. 5 is attached to a partition plate having a protrusion.

FIG. 10 is a view illustrating an example in which the reactor of FIG. 5 is attached to a partition plate having a protrusion. A protrusion 12e is formed on a partition plate 12A illustrated in FIG. 10. The protrusion 12e is shaped to fit into the opening 51f of the fixing member 510d. By the protrusion 12e being fitted into the opening 51f, the first heat transfer member 5 provided in the opening 51f is pressed from the protrusion 12e in the Y-axis direction, and the thermal resistance between the first heat transfer member 5 and the partition plate 12A is further reduced.

Although the example configuration of the outdoor unit 1 of the air conditioning apparatus 100 which is an example of the refrigeration cycle apparatus has been described in the present embodiment, the reactor, the fixing member, the first heat transfer member, the second heat transfer member, and the third heat transfer member are applicable also to a heat pump water heater and a water heater, which are a type of refrigeration cycle apparatus. When the reactor, the fixing member, the first heat transfer member, the second heat transfer member, and the third heat transfer member are applied to the heat pump water heater or the water heater, the reactor is installed on a partition plate in an outdoor unit included in the heat pump water heater or the water heater.

The configurations described in the embodiment above are merely examples of the content of the present invention and can be combined with other known technology and part thereof can be omitted or modified without departing from the gist of the present invention.

The invention claimed is:

1. A refrigeration cycle apparatus comprising:
a partition plate that partitions an inside of a housing of an outdoor unit into a blower chamber and a machine chamber;
a reactor attached to the partition plate on a side of the machine chamber;
a fixing member that fixes the reactor to the partition plate; and
a plate-like first heat transfer member provided between the reactor and the partition plate, wherein
the first heat transfer member is provided between the partition plate and the reactor,
thermal resistance of the first heat transfer member is smaller than thermal resistance of the fixing member, and
grooves wider than the first heat transfer member are formed in a portion of the partition plate facing the first heat transfer member.

2. The refrigeration cycle apparatus according to claim 1, wherein the reactor comprises a second heat transfer member that covers a part of an outer peripheral surface of a winding wound around a core of the reactor, and covers a part of an outer peripheral surface of the core.

3. The refrigeration cycle apparatus according to claim 2, wherein
the reactor comprises a heat insulating member that covers the outer peripheral surface of the winding wound around the core and covers a part of the outer peripheral surface of the core; and
the second heat transfer member is provided inside the heat insulating member.

4. The refrigeration cycle apparatus according to claim 3, wherein thermal resistance of the heat insulating member is larger than thermal resistance of each of the first heat transfer member and the second heat transfer member.

5. The refrigeration cycle apparatus according to claim 1, wherein the reactor comprises a heat insulating member that covers a part of an outer peripheral surface of a winding wound around a core of the reactor, and covers a part of an outer peripheral surface of the core.

6. The refrigeration cycle apparatus according to claim 1, wherein
a support that supports the reactor is provided on the partition plate,
the reactor comprises a third heat transfer member provided between the support and a core of the reactor,
the third heat transfer member is in contact with the support, the core, and a winding wound around the core, and
thermal resistance of the third heat transfer member is smaller than thermal resistance of the fixing member.

7. The refrigeration cycle apparatus according to claim 1, wherein
heat transfer member protection plates protruding toward the partition plate are provided on the fixing member, and
insertion holes into which the heat transfer member protection plates are inserted are formed in the partition plate.

8. The refrigeration cycle apparatus according to claim 1, wherein
an opening into which the first heat transfer member is inserted is formed in the fixing member, and
a protrusion shaped to fit into the opening is formed in the partition plate.

* * * * *